Nov. 28, 1961  A. C. KRABACHER  3,011,126
INSTRUMENT MOUNTING
Filed Nov. 3, 1958  2 Sheets-Sheet 1

INVENTOR.
Albert C. Krabacher
BY
McGrew Edwards
ATTORNEYS

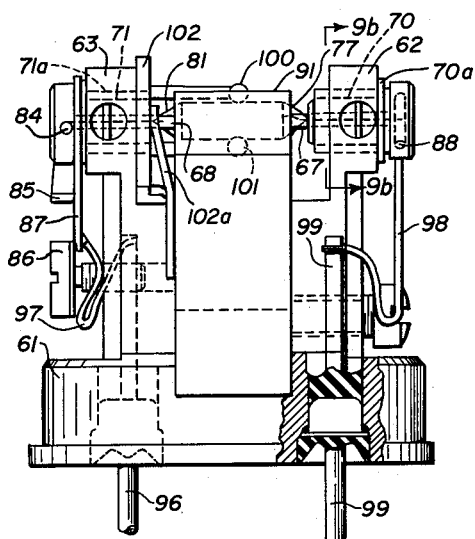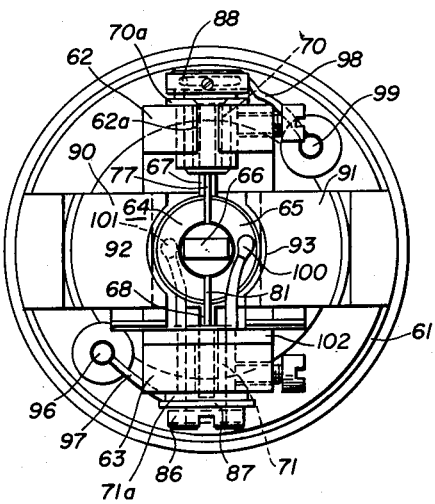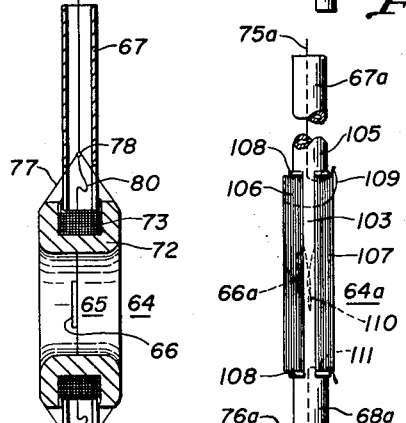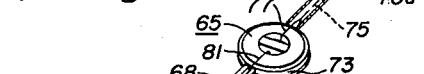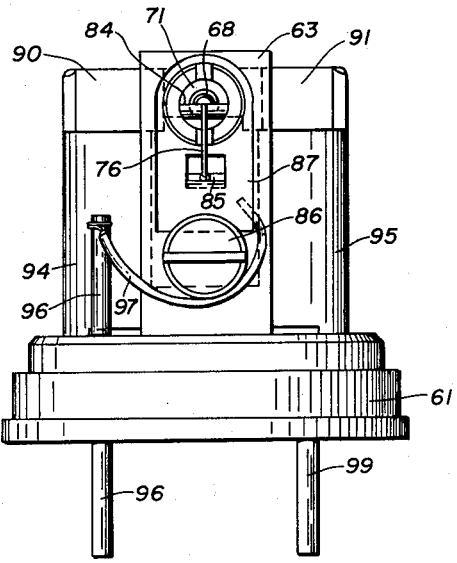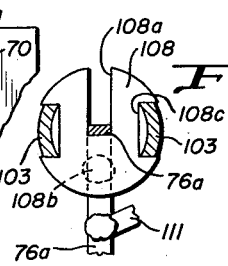
INVENTOR.
Albert C. Krabacher
BY
ATTORNEYS United States Patent Office 3,011,126
Patented Nov. 28, 1961

3,011,126
INSTRUMENT MOUNTING
Albert C. Krabacher, Lakewood, Colo., assignor, by mesne assignments, to Hathaway Instruments, Inc., Denver, Colo., a corporation of Delaware
Filed Nov. 3, 1958, Ser. No. 771,632
14 Claims. (Cl. 324—154)

This invention relates to the mounting of the moving elements of instruments such as galvanometers and the like and particularly to damping systems for preventing unwanted deflection due to high intensity dynamic forces such as external shock or vibration applied to the instrument.

Galvanometers and other sensitive measuring instrument having rotatable moving elements when mounted on equipment subject to severe shocks or vibrations may be rendered ineffective or useless because of erratic or unwanted movement upon application of the shock forces to the frames or supports of the instruments. For example, a galvanometer having a moving element suspension of the flexible ribbon type has unequal radial distribution of rigidity about the axis of rotation of the moving element; when external forces are applied to the galvanometer support transversely of the axis of rotation, this unequal radial distribution of rigidity results in a displacement which causes rotation of the moving element because of the tendency of the suspension to flex in its least rigid direction. This non-uniform radial distribution of rigidity exists in the suspension ribbon because it is rectangular rather than circular in cross-section and it also exists in the flat triangular loop or yoke section of the suspension frequently employed to connect the single filament and the bobbin of the galvanometer driving coil.

Various damping arrangements or systems have been provided for galvanometers and the like in the effort to overcome or minimize the unwanted displacement forces. The arrangements provided heretofore have been effective for many types of application but they have not proved fully satisfactory for applications involving high intensity shock and vibration. Accordingly, it is an object of this invention to provide a galvanometer or the like including an improved arrangement for minimizing unwanted displacement of the moving element of the instrument.

It is another object of this invention to provide a galvanometer or the like having a rotatable moving element and suspension of non-uniform rigidity about its axis and an improved damping arrangement for preventing displacement of the element by vibration or shock forces applied to the instrument transversely of the axis of its moving element.

It is another object of this invention to provide an improved damping arrangement for galvanometers or similar instruments for preventing deflection due to externally applied shock or vibration forces.

Briefly, in carrying out the objects of this invention in one embodiment thereof, a galvanometer having a flexible ribbon suspension for holding its driving coil under tension for rotation about the longitudinal axis of the suspension is provided with light cylindrical tubes or trunnions rigidly secured to the driving coil and extending from either end thereof along and concentric with the axis of rotation. Hollow cylinders or sleeves having internal walls surrounding and in closely spaced relationship with the tubes are mounted on the galvanometer frame or support, the walls being concentric with the tubes. A body of damping liquid fills the space between the tube and the walls of the cylinders and provides uniform resistance to vibration in all radial directions about the axis. The symmetrical radial distribution of the damping surfaces with all surfaces of the tubes equidistant from the axis of rotation prevents the transmission of turning movement to the moving element. The coil or driving element and the tubes constitute a rigid unit and no flexure can occur, dynamic forces transverse to the driving element axis being opposed by equal and opposite forces acting through the fluid bodies.

The features of this invention which are believed to be novel are set forth with particularity in the appended claims. The invention itself, however, both as to its organization and method of operation, together with further objects and advantages thereof, may best be understood by reference to the following description taken in connection with the accompanying drawings in which:

FIGS. 6, 7 and 8 are plan, side and end elevation views of another embodiment of the invention;

FIG. 9 is an enlarged sectional view of the moving element suspension of the embodiment of FIGS. 6, 7 and 8;

FIG. 9a is an exploded perspective view of the moving element suspension of FIGS. 6, 7 and 8 and its mounting members;

FIG. 9b is an enlarged sectional view of a portion of the device taken along the line 9b—9b of FIG. 8;

FIG. 10 is a view similar to FIG. 9 illustrating another moving element suspension suitable for use in the device of FIG. 6; and FIG. 11 is a greatly enlarged detail view of one part of the device of FIG. 10.

Figure 1:
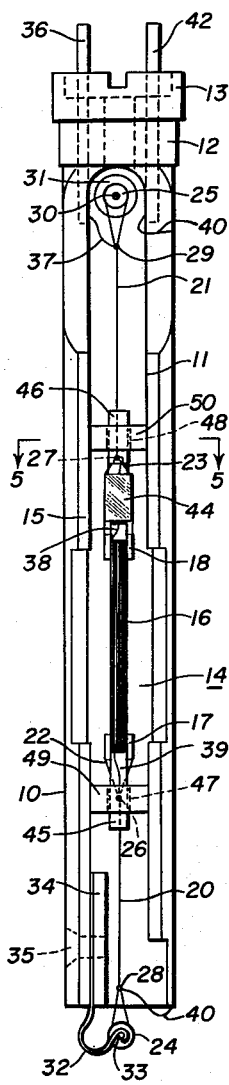
FIG. 1 is a front elevation view of a galvanometer embodying the invention.
Figure 2:
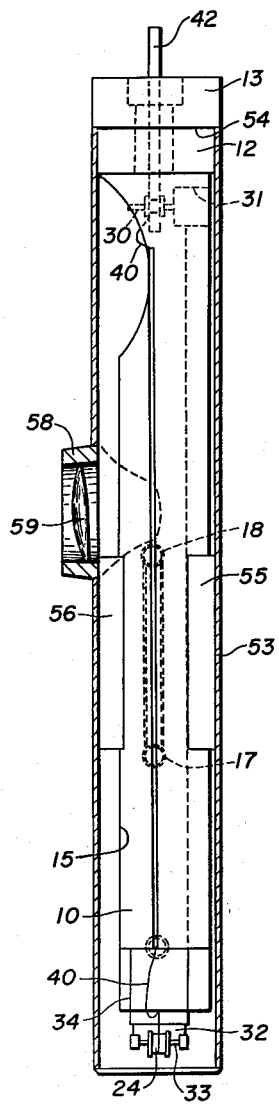
FIG. 2 is a side elevation view of the galvanometer shown in FIG. 1 with the addition of a portion of the external casing shown in section.

Referring now to the drawings, the galvanometer illustrated in FIGS. 1 and 2 comprises a frame or barrel 10 which has been machined from solid round rod stock, a chamber or groove 11 having been milled longitudinally of the rod to provide the channel in which the moving element suspension assembly 14 is mounted. The channel 11 is closed at the upper end where it terminates short of a mounting or cap section comprising cylindrical sections 12 and 13 both of larger diameter than the body of the frame 10, the section 12 having a diameter intermediate that of the body 10 and section 13. The front face of the body 10 along the two sides of the channel is milled down to provide flats 15.

Figure 3:
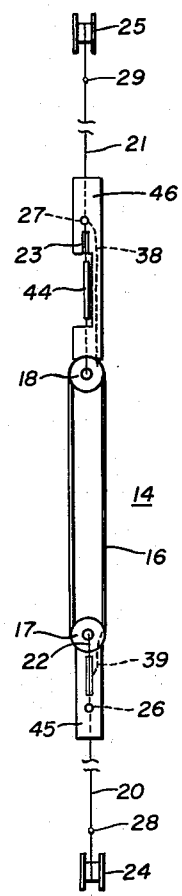
FIG. 3 is an enlarged side elevation of the suspension assembly of the galvanometer of FIG. 1.
Figure 4:
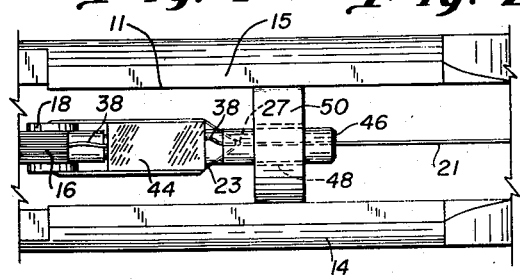
FIG. 4 is an enlarged view of a portion of the galvanometer of FIG. 1.

The moving element suspension assembly, as clearly shown in FIG. 3, comprises an elongated coil 16 wound over two insulating bobbins 17 and 18. The suspension includes a flexible flat wire or ribbon of conducting metal which in this assembly comprises two sections 20 and 21 connected by loops 22 and 23 to anchoring spools 24 and 25, respectively. The loops 22 and 23 pass through central openings in the bobbins 17 and 18 and the ends of the loops are soldered or otherwise bonded to the ribbons 20 and 21 at junctions 26 and 27, respectively. Loops are also formed at the other ends of the sections 20 and 21 and pass over the spools 24 and 25 and are bonded to the respective sections as indicated at junctions 28 and 29.

The spool 25 is anchored at the closed end of the channel 11 on a pin or staff 30 formed on an integral base 31 pressed into a recess in the frame 10 indicated in FIGS. 1 and 2; and the suspension is held under tension by a spring 32 having two arms engaging a pin 33 on which the spool 24 is mounted. The spring 32 is secured to the frame 10 by a clamping plate 34 secured to the frame by a screw 35. The tension of the spring is selected and adjusted to secure the predetermined desired natural frequency of the suspension.

The electrical connections to the coil 16 are completed from a contact pin or plug 36 through a wire 37 to the section 21, thence through the junction 27 and a lead 38 to the coil 16. The circuit then continues from the other terminal of the coil through a lead 39, the junction 26, the section 21, junction 28 and a lead 40 to the other contact pin or plug indicated at 42. The lead 40 passes from the junction 28 to the outer wall of the frame 10 and into a groove 43 along the wall of the frame and thence to the channel 11 where it is connected to the pin 42. A mirror 44 is mounted on the assembly between the legs of the filament loop 23 for movement with the coil 16 and is employed to produce a light trace for photographic or visual purposes in the usual manner.

The suspension assembly as just described is essentially similar to that employed in many oscillograph galvanometers in current use and it will be noted that the flat section of the suspension filament and the construction of the triangular loops connecting the filament sections and the coil bobbins is such that the radial distribution of rigidity about the axis of rotation is non-uniform. Dynamic forces such as shocks or vibrations applied transversely of the axis of rotation thus produce rotational tendencies in the assembly because the suspension tends to flex in the direction of least rigidity. In other words the rigidity which determines the resistance to movement of the suspension laterally of its axis is different in different radial positions about the axis. For example, a force applied in a direction normal to the plane of the suspension ribbon meets minimum resistance while the same force applied against the edge of the ribbon, and thus at ninety degrees to the first position, meets maximum resistance. The ribbon tends to twist into a position of less resistance and this twisting occurring when the force is applied at radial positions other than normal to the plane of the ribbon produces the unwanted rotational displacement of the suspension element. The triangular loops provide relatively large flat areas having similar differences in resistance to movement upon the application of forces at different radial positions about the axis of the suspension. This is apparent from consideration of the effect of applying a force to the suspension intermediate the two loops in a direction parallel to the triangles; such force increases tension on the far sides of the loops and decreases tension on the near sides; the suspension tends to turn to equalize these forces by twisting whenever the force is applied at angles other than normal to the plane of the loop. In order to prevent such unwanted displacement of the driving member a damping arrangement is provided which assures even distribution of the applied dynamic forces and prevents the rotational displacement of the suspension due to its non-uniform radial distribution of rigidity. Two cylindrical tubes or sleeves 45 and 46 are rigidly secured to the ends of the coil 16, the tube 45 being bonded to the bobbin 17 and the tube 46 to the bobbin 18. The tube 46 is longer than the tube 45 and has a slot cut away to accommodate the mirror 44 in a position parallel to the axis of the suspension. The tubes 45 and 46 are concentric with the axis of the coil and thus provide external surfaces which are equidistant from the axis in all directions throughout the length of each tube. These tubes constitute rigid extensions of the coil or driving element of the suspension.

Figure 5:
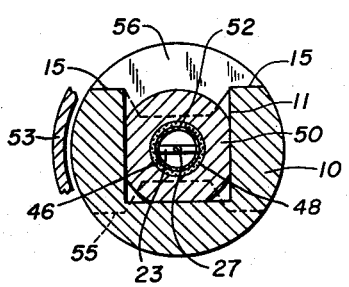
FIG. 5 is an enlarged sectional view along the line 5—5 of FIG. 1.

When the moving assembly is mounted in the frame the tubes are arranged within cylindrical bores 47 and 48 in blocks 49 and 50, respectively, rigidly secured to the frame in the channel 11. The bores 47 and 48 are concentric with the axis of the coil 16 and are slightly spaced from the tubes 45 and 46, and a damping liquid indicated at 52 in FIG. 5 is introduced into the space and held by capillary action so that the tubes are held in engagement with the liquid at all times. Cylindrical damping zones concentric with the axis and of uniform thickness are maintained at all times and any shock or vibration forces applied against the frame 10 transversely of the axis of rotation are distributed uniformly about the axis and no unwanted rotation or other displacement occurs. Thus, regardless of the direction of the applied force, there is no resultant tendency to produce rotation of the suspension assembly due to its non-uniform radial distribution of rigidity.

The dimensions of the sleeves or tubes 45 and 46 and the spacing of the cylindrical faces 47 and 48 and also the viscosity of the damping liquid are selected in accordance with the characteristics and environment of the system, the natural frequency of the suspension and the required sensitivity of the instrument. The manner in which these various factors may be adjusted or balanced to secure the required results is well known to those skilled in the art.

The complete assembly as described above is enclosed in an outer casing or housing 53 shown in section in FIGS. 2 and 5 and comprising a cylindrical tube which fits about the assembly in spaced relationship and is seated on the mounting section 12. A sealing gasket 54 is located between the end of the casing 53 and the shoulder formed by the section 13, the casing 53 and section 13 being of the same external diameter. The casing is spaced from the frame 10 by a minimum distance determined by the difference in the radii of the frame and the mounting section 12. The casing also serves to hold a pair of magnetic pole pieces 55 and 56 in seats formed in the casing; the pole pieces are located on either side of the coil 16, and their outer surfaces are cylindrical and conform to the inner wall of the casing 53. The casing is provided with a window frame or boss 58 in which a lens 59 is mounted in alinement with the mirror 44.

The complete assembly provides a unit suitable for insertion in a permanent magnet mounting similar to that disclosed in United States Letters Patent No. 2,698,417, Claude M. Hathaway, issued on December 28, 1954. It has been found that when galvanometers embodying the present invention are mounted in equipment subject to severe vibration and shock, continuous and accurate recordings or indications may be secured without noticeable or significant unwanted displacement of the indicating elements when subjected to the forces of such vibrations or shock.

Figs. 6, 7 and 8 illustrate an embodiment of the invention wherein a galvanometer suspension is employed to operate as an off-on instrument which may be employed, for example, to give an indication of the condition of excitation or non-excitation of a selected circuit. The instrument as shown in FIGS. 6, 7 and 8 comprises a circular base 61 on which are mounted two upright posts or columns 62 and 63 which carry a galvanometer-type suspension 64 near their upper ends. The suspension includes a circular coil or driving element 65 having a mirror 66 mounted centrally thereof. The top of the column 62 is provided with an open slot 62a for facilitating the insertion and mounting of the suspension. The driving element is provided with cylindrical sleeves 67 and 68 similar to the sleeve 45 of the first embodiment and which pass through stationary bosses or sleeves 70 and 71, respectively. These sleeves are made of a suitable material such as Phosphor bronze and are mounted in the upper ends of the columns in insulating bushings 70a and 71a. The driving member is mounted on a filament suspension similar to that of the first modification.

The construction of the suspension is more clearly shown in FIGS. 9 and 9a. As shown in these figures, the driving member 64 comprises an insulated bobbin or spool 72 having a circumferential groove in which is wound a coil 73. The filament suspension comprising portions 75 and 76 extending through the tubes 67 and 68, respectively, is secured to the spool 72 by loops similar to those employed in the first embodiment; the tubes are slotted adjacent the spool to afford passage of the legs of the loops to the inside of the tubes; the loop for the portion 75 as indicated at 77 passes around the spool 72 and has its free end joined to the main portion at a junction 78 to which a lead 80 for the coil 73 is also joined. In a similar manner the portion 76 terminates in a loop 61 passing around the bobbin and having its free end bonded at a junction 82 to which the other lead of the coil 73 is connected as indicated at 83.

The portion 76 of the filament passes over a round bar 84 extending across the boss 71 and thence downwardly to a tension anchor 85 to which it is bonded to provide an adjustable tensioning assembly, the adjustment being effected by turning a screw 86 mounted in the post 63 for varying the position of a spring plate 87 on which the tension anchor is formed. The other portion 75 of the filament suspension passes over a round bar 88 like the bar 84 and mounted in the support 62 but at an angle of 45° thereto so that the suspension is twisted, the driving member being thereby biased to lie at an angle of about 22½° to the plane of the base 61 when the coil is not energized.

Magnetic pole pieces 90 and 91 are positioned on opposite sides of the driving coil 64 and have faces concentric therewith as indicated at 92 and 93. These pole pieces are mounted on uprights 94 and 95, respectively, secured to the base 61. The electrical connections pass from a conducting post 96 insulated from and mounted in the base through a flexible connection 97 to the anchor 85, thence through the suspension assembly and the portion 75 to a lead 98 connected to a second conducting post 99 also mounted in and insulated from the base.

The spaces between the sleeves 67 and 68 and the walls of their surrounding bosses 70 and 71 are filled with liquid damping fluid to provide a damping characteristic in the same manner as is provided in the modification of FIG. 1. In FIGS. 6 and 8 of the drawing the spool 72 has been illustrated in its position when the coil 73 is energized and the spool is in engagement with upper and lower stops 100 and 101 on opposite sides along the center line at right angles to the suspension axis. These stops prevent further rotation of the member 64 counterclockwise as viewed in FIG. 7. When the coil 73 is not energized it lies in the position indicated in FIG. 9a wherein the driving member 64 returns to its position at about 22½° to the plane of the base 61. It will readily be apparent that this device may be employed as an off-on indicator by employing a light beam which gives an indication by reflection to a predetermined target only when the element 64 is against the stops 100 and 101. The stops 100 and 101 are secured to a plate 102 rotatably mounted and held by friction rigidly against the support 63 by a flat spring 102a; thus the position of the stops may be changed about the axis of the suspension by turning the plate to adjust the energized position of the driving element 64.

The arrangement of the damping sleeves which provide surfaces spaced from the axis of rotation and equidistant from the axis, as shown in section in FIG. 9b, prevents the unwanted displacement of the suspension assembly due to its non-uniform radial distribution of rigidity and assures the required operation and precise indication regardless of severe vibration or shock to which the instrument is subjected.

A modified form of the suspension assembly suitable for the instrument of FIG. 6 is illustrated in FIG. 10. This assembly is generally similar to that of FIG. 9 and corresponding parts have been designated by the same numerals with the addition of the suffix letter "a." The damping tube or cylinder portions 67a and 68a are integral parts of a tube 103 which extends entirely through the driving coil assembly 64a and has been cut away centrally as indicated at 104 and 105 to provide seats for two symmetrical coil sections 106 and 107 of the drive assembly. The coil sections 106 and 107 which are shown in a view of the drawing are circular coils of substantially flat form and the mirror 66a is mounted in the center of the driving member in a manner similar to the mirror 66 in FIG. 9 and is on the side of the axis opposite the coil end connections as viewed in FIG. 10, thus providing a degree of counterbalance for the coil ends.

The coil sections are locked in position on the tube 103 by two insulating plates or blocks 108 one of which is shown in detail in FIG. 11; these plates have the inner ends of the filament sections 75a and 76a passing through a slot indicated at 108a in FIG. 11 and cemented or otherwise fastened to them at 108b so that the filaments engage the plates at the center of the tube 103. The slots 108c accommodate the connecting portions of the tube 103. Thus the use of the looped connections for attaching the filament to the driving element is avoided and the single filament portions 75a and 76a are secured so that their center axis coincides with the axis of rotation throughout the suspended portions of the filaments. The mirror 66a is secured to the two side portions of the tube 103 within the cut-away section 104 and is bonded thereto by suitable cement. The circuit of the two coil sections 106 and 107 is completed to make a single coil driving member by a lead 109 from the coil 106 to the filament 75a, a junction 110 of the two inner leads of the coils, and a lead 111 connecting the other end of the coil 107 to the filament 76a.

The tube 103 being continuous, and providing both the damping cylinders 67a and 68a, inherently provides the axis on which the filament suspension is adjusted and on which the coil rotates.

From the foregoing it is readily apparent that a simple and effective damping arrangement has been provided for assuring the required precision operation of galvanometers and similar instruments which must be subjected to heavy vibrations and shock forces applied transversely of the axis of rotation.

While the invention has been described in connection with specific types of instruments, various other applications and modifications will occur to those skilled in the art. Therefore, it is not desired that the invention be limited to the details of construction illustrated and described and it is intended by the appended claims to cover all modifications which fall within the spirit and scope of the invention.

I claim:

1. A galvanometer or the like including a rigid support, a moving element comprising a flexible suspension portion and a driving portion intermediate the ends thereof, means for anchoring the ends of said suspension portion and for maintaining said element under tension whereby said driving portion rotates about a predetermined longitudinal axis, said flexible suspension portion having unequal radial distribution of rigidity about said axis, and damping means for preventing angular displacement of said driving portion about said axis by external dynamic forces applied to said support transversely of said axis, said damping means comprising a member having a perimeter of circular cross section normal to said axis attached rigidly to said driving portion and positioned with the center of its perimeter on said axis, the radius of said member being several times greater than the maximum cross-sectional dimension of said flexible portion, means on said support providing a circular opening having its wall concentric with the perimeter of said member and spaced therefrom a distance which is small as compared with the radius of said member, and damping liquid in the space between said wall and the perimeter of said member and held therein by capillary action.

2. A galvanometer or the like as set forth in claim 1 wherein said member and said opening are of cylindrical form and extend a substantial distance along said axis.

3. A galvanometer or the like as set forth in claim 2 wherein all the damping liquid for said galvanometer is confined entirely within the space between said cylindrical member and the wall of said opening.

4. A galvanometer or the like as set forth in claim 1 wherein said member is a cylindrical tube and said opening is cylindrical and the walls thereof extend a substantial distance along said tube.

5. A galvanometer or the like including a rigid support, a moving element comprising a flexible suspension portion and a driving portion intermediate the ends thereof, means for anchoring the ends of said suspension portion and for maintaining said element under tension whereby said driving portion rotates about a predetermined longitudinal axis, said flexible suspension portion having unequal radial distribution of rigidity about said axis, and damping means for preventing angular displacement of said driving portion about said axis by external dynamic forces applied to said support transversely of said axis, said damping means comprising two members having perimeters of circular cross section normal to said axis attached rigidly to said driving portion one on either side thereof and positioned with the center of their perimeters on said axis, the radius of each of said members being several times greater than the maximum cross-sectional dimension of said flexible portion, means on said support providing two circular walled openings each surrounding a respective one of said members and having its wall concentric with the perimeter of the member and spaced therefrom a distance which is small as compared with the radius of the respective member, and damping liquid in each of the spaces between and in engagement with the wall of the opening and the perimeter of the member and retained in said spaces by capillary action.

6. A galvanometer or the like as set forth in claim 5 wherein said members and said openings are of cylindrical form and extend a substantial distance along said axis.

7. A galvanometer or the like as set forth in claim 6 wherein all of the damping liquid for said galvanometer is confined entirely within the spaces between the respective cylindrical members and the walls of the respective openings.

8. A galvanometer or the like as set forth in claim 5 wherein said members are cylindrical tubes and said openings are cylindrical and the walls thereof extend a substantial distance along said tubes.

9. A galvanometer or the like as set forth in claim 5 including stop means rigid with respect to said support and positioned in the path of said driving portion to limit the rotation of said member about said axis upon energization thereof.

10. A galvanometer or the like as set forth in claim 5 wherein said driving portion comprises a flat coil parallel to said axis and positioned symmetrically with respect thereto, means including two stops connected with said support and positioned one on either side of said driving portion and arranged to engage said portion in substantially the same plane normal to said axis for engaging opposite sides of said driving portion simultaneously upon rotation of said coil to a predetermined position, and means for biasing said driving portion away from said stops.

11. A galvanometer or the like including a rigid support, a moving element comprising a driving portion and a suspension portion comprising two flexible conducting ribbons extending from respective sides of the driving portion, a tube passing centrally through said driving portion and secured rigidly thereto and extending on two sides thereof, said tube having a radius several times greater than the maximum cross-sectional dimension of said flexible ribbons, means extending across the interior of said tube on either side of said driving portion for anchoring the inner ends of said ribbons at the center of said tube, means for anchoring the outer ends of said ribbons to said support and for maintaining said ribbons under tension whereby said driving portion is rotatable on a predetermined longitudinal axis coinciding with the longitudinal axis of said tube and said suspension has unequal radial distribution of rigidity about its longitudinal axis, means rigid with respect to said support and providing two cylindrical walls concentric with and spaced radially outwardly from said tube one on one side of said driving portion and the other on the other, the radial distance between said tube and said cylindrical walls being small as compared with the radius of said tube, and a body of liquid retained by capillary action in the spaces between said tube and each of said cylindrical walls, said liquid preventing lateral movement of said driving portion upon application of external forces transverse to said axis while affording normal rotation of said driving portion.

12. A galvanometer or the like as set forth in claim 11 wherein said driving portion comprises two flat coils of the same size one on one side and one on the other of said tube and wherein said tube is cut away centrally thereof to provide seats accommodating said coils and for holding them in symmetrical positions on either side of the tube.

13. A galvanometer or the like including a rigid support, a moving element comprising a flexible filament suspension of generally flat across section and a driving coil member intermediate the ends thereof, means for anchoring the ends of said suspension for mounting said element under tension whereby said coil member is rotatable about a predetermined longitudinal axis, the flat cross section of said suspension presenting greater resistance to lateral pressure in alignment with its flat face than normal thereto and rendering said suspension more readily deformable upon application of forces transverse to said axis in one direction than in another, and damping means for preventing lateral movement of said coil member and thereby preventing angular displacement due to the tendency of said suspension to flex in its least rigid direction about said axis by external forces applied to said support transversely of said axis, said damping means comprising a cylindrical tube attached at one end rigidly to said coil member and extending longitudinally away therefrom concentrically about said axis, the radius of said tube being several times greater than the width of said filament, means connected rigidly with respect to said support and providing a hollow cylinder concentric with said tube and spaced therefrom a distance which is small as compared with the radius of said tube, and a body of liquid damping fluid retained by capillary action within said hollow cylinder and in engagement with the outer wall of said tube for connecting said tube and said cylinder in damping relationship.

14. A galvanometer or the like as set forth in claim 13 wherein said suspension is connected to said coil member by a loop of said suspension extending about the coil member and providing a generally triangular section, the ends of said loop adjacent said coil member extending beyond the outer walls of said tube, and said tube having openings therein to accommodate passage of the ends of said loop.

References Cited in the file of this patent

UNITED STATES PATENTS

| | | |
|---|---|---|
| 800,873 | Northrup | Oct. 3, 1905 |
| 2,205,777 | Fairchild | June 25, 1940 |
| 2,535,065 | Heiland | Dec. 26, 1950 |
| 2,596,019 | Fisher | May 6, 1952 |
| 2,623,083 | Schlumberger | Dec. 23, 1952 |
| 2,716,680 | Muzzey | Aug. 30, 1955 |
| 2,719,264 | Murray | Sept. 27, 1955 |
| 2,851,664 | Tavis | Sept. 9, 1958 |